United States Patent [19]

Takada

[11] 4,189,109
[45] * Feb. 19, 1980

[54] AUTOMATIC LOCKING SAFETY BELT RETRACTOR

[75] Inventor: Juichiro Takada, Tokyo, Japan

[73] Assignee: Takata Kojyo Co., Ltd., Tokyo, Japan

[ * ] Notice: The portion of the term of this patent subsequent to Apr. 24, 1996, has been disclaimed.

[21] Appl. No.: 930,474

[22] Filed: Aug. 2, 1978

[30] Foreign Application Priority Data

Nov. 29, 1977 [JP] Japan ............................ 52/159197[U]

[51] Int. Cl.$^2$ ........................ A62B 35/02; B54H 75/48
[52] U.S. Cl. ............................................. 242/107.4 A
[58] Field of Search ................. 242/107.4 R, 107.4 E; 297/388; 280/744–747

[56] References Cited

U.S. PATENT DOCUMENTS

| | | | |
|---|---|---|---|
| 3,578,260 | 5/1971 | Kell | 242/107.4 A |
| 4,053,117 | 10/1977 | Takada | 242/107.4 A |
| 4,066,223 | 1/1978 | Takada | 242/107.4 A |

Primary Examiner—John M. Jillions
Attorney, Agent, or Firm—Wolder, Gross & Yavner

[57] ABSTRACT

An automatic locking safety belt retractor includes a mounting frame having side walls between which a spring biased retractor reel is journalled and a ratchet wheel rotatable with the reel is located on the outer face of a side wall. A plastic guide plate is secured to the side wall outside face and has a circular opening engaged by the ratchet wheel, a slot tangentially extending from the opening and a housing recess projecting laterally from the upper end of the slot. Outwardly projecting reinforcing flanges are integrally formed along opposite parallel edges of the slot and along the bottom inclined edge of the junction between the slot and opening. A high strength bumper member is located in the recess and forms the top of the slot. A stop member is slidable in the slot and includes a tooth which in its depressed retracted position is out of engagement with the ratchet wheel and when slightly raised by an acceleration sensor engages the ratchet wheel which advances the stop member with belt extraction to strike the bumper member which stops the stop member and brakes the reel.

10 Claims, 4 Drawing Figures

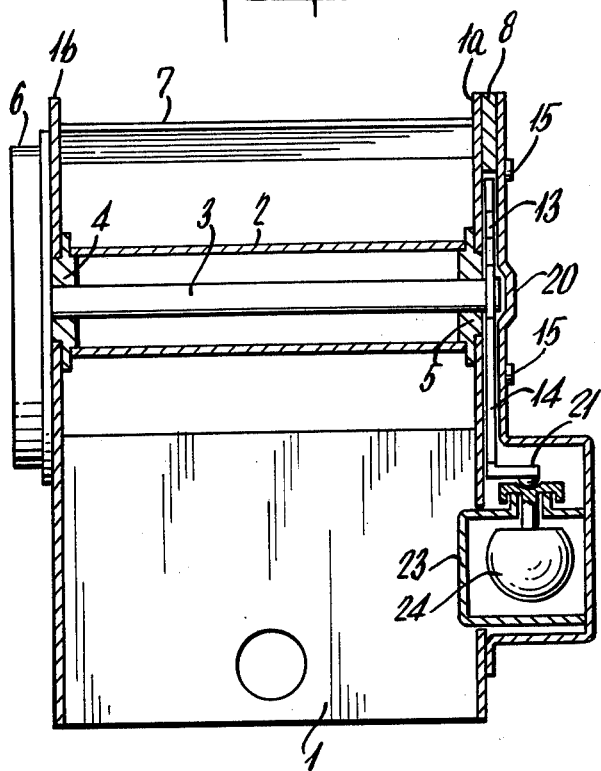
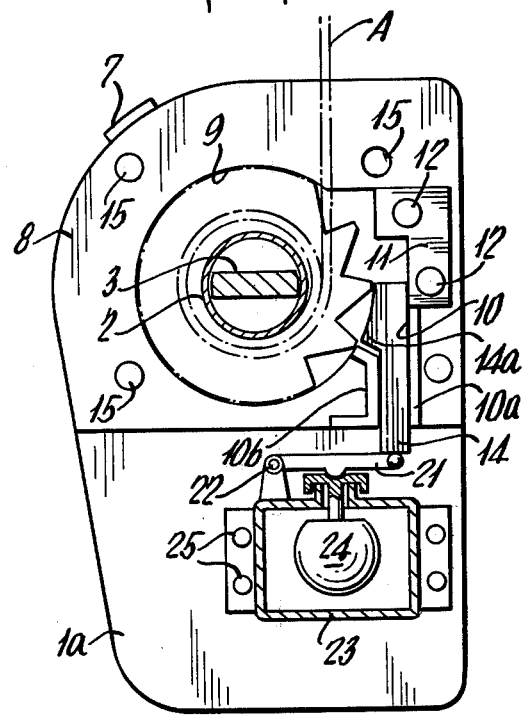
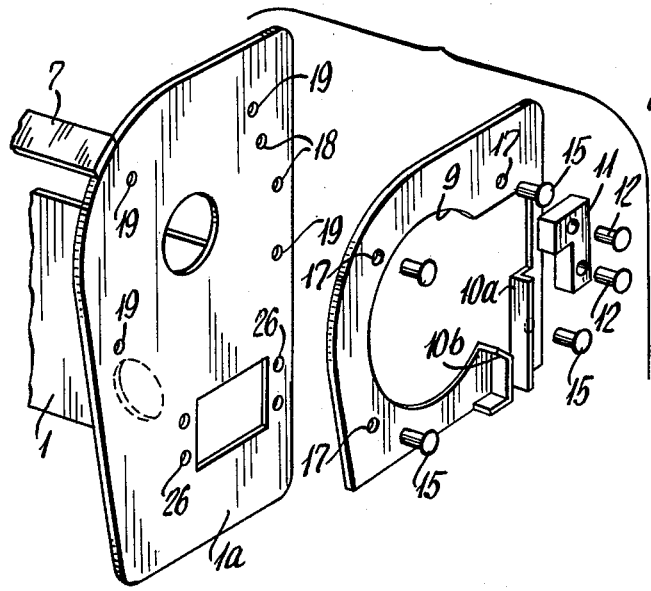
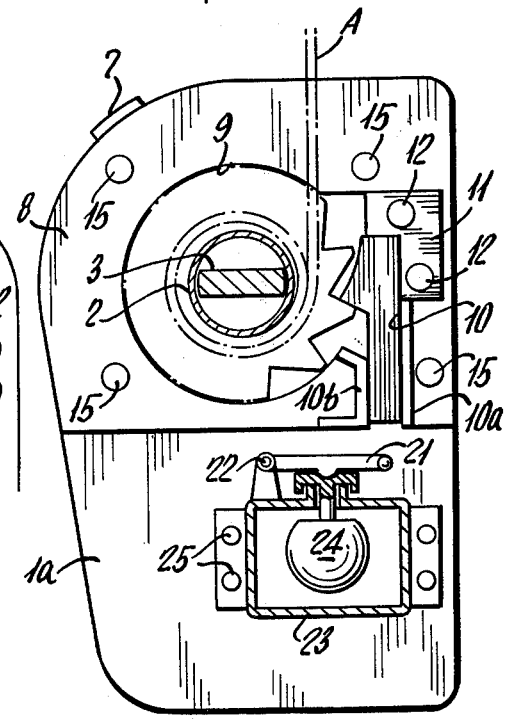

AUTOMATIC LOCKING SAFETY BELT RETRACTOR

BACKGROUND OF THE INVENTION

The present invention relates generally to improvements in automatic locking safety belt retractors used in vehicles and it relates more particularly to an improved acceleration responsive automatic locking belt retractor provided with a mechanism for sensing the change of movement of a vehicle and locking the seat belt against extraction in response to a predetermined acceleration.

There are various types of conventional vehicle safety or restraint belt retractors which lock a seat belt in response to a sharp change in the speed of the vehicle when it collides with an object. In conventional retractors, however, the acceleration sensitivity is very high and the acceleration sensing mechanism is repeatedly actuated and deactuated at a high frequency. Consequently, for example, in a mechanism in which a ratchet wheel rotating with the belt retraction reel is with a pawl to lock the reel and seat belt, it occasionally happens that the tips of the teeth of the ratchet wheel and the pawl tooth or tip are momentarily in the same position. In such an event, the tips of the ratchet wheel teeth, the rotational speed of which has been greatly increased by the belt withdrawing force outwardly kick or impel the pawl tooth so as to prevent the pawl from engaging the ratchet wheel. As a result, the belt is withdrawn a considerable and excessive amount by the time the pawl has returned to a proper position where it can engage the ratchet wheel. The above occurrence substantially prevents the proper and reliable functioning of the seat belt. In some cases, the teeth of the ratchet wheel or the pawl tooth are damaged to thereby prevent a complete and proper engagement therebetween.

The applicant, in co-pending U.S. application Ser. No. 901,049 filed Apr. 28, 1978 now U.S. Pat. No. 4,150,799 proposed an automatic locking retractor reel in which the above-mentioned drawbacks encountered in conventional reels are eliminated and in which a pawl is not employed. Such an acceleration responsive automatic braking safety belt retractor includes a mounting bracket having opposing side plates between which is journalled a shaft carrying a belt retraction wheel betwen the side plates and a ratchet wheel along the outside face of a first plate. A guide plate is affixed to the first plate outside face and has a circular opening registering with the ratchet wheel periphery and a linear guide slot vertically tangent to the opening and terminating at its top in a transverse stop shoulder and communicates along its upper inner side with the opening the lower part of the communication being delineated by an outwardly downwardly inclined second stop shoulder. A stop member is longitudinally slidably engaged and depends from the slot and is provided with an inwardly directed projection having an arcuate upper edge and a bottom edge parallel to the second shoulder. A lever engages the stop member bottom edge and is swung upwardly by an acceleration actuated pendulum to raise the stop member and bring the projection into engagement with the ratchet wheel to brake it and the reel. While the aforesaid retractor is highly satisfactory, it possesses important drawbacks, among which is lack of great durability and frequent impairment of operation following long use.

SUMMARY OF THE INVENTION

It is a principal object of the present invention to provide an improved automatic locking safety belt retractor.

Another object of the present invention is to provide an improved vehicle acceleration responsive automatic locking safety belt retractor reel.

Still another object of the present invention is to provide an improved safety belt retractor reel provided with a vehicle acceleration actuated reel locking member which is resistant to the wear attendant to repeated actuation at high frequency.

A further object of the present invention is to provide a device of the above nature characterized by its simplicity, ruggedness, long operable life and high reliability.

The above and other objects of the present invention will become apparent from a reading of the following description taken in conjunction with the accompanying drawings which illustrate preferred embodiments thereof.

In a sense, the present invention contemplates the provision of an improved acceleration responsive automatic locking safety belt retractor which comprises a mounting frame including opposite side walls, a belt retractor reel extending between the frame side walls and rotatable in belt extraction and belt retraction directions and spring biased to rotate in a belt retraction direction, a peripherally toothed brake wheel located along the outside face of a first of the frame side walls and rotatable with the reel, a guide member mounted on the first frame side wall outside face and having a circular opening concentric with and engaged by the brake wheel and a guide slot extending from a trailing to a leading edge thereof parallel to a tangent to the circular opening and communicating along a side of the slot with the circular opening through an access opening, a shock resistant bumper member located in the slot at the leading end thereof, a stop member engaging the slot and being longitudinally slidably moveable therein between retracted and advanced positions and including an inwardly directed tooth registering with the access opening and being out of engagement with the brake wheel in the stop member retracted position and engaging the brake wheel in a position of the stop member in advance of its retracted position, and sensing means for advancing the stop member to bring the stop member tooth into engagement with the brake wheel whereby belt extraction rotation of the brake wheel further moves the stop member to its fully advanced position to strike and be stopped by the bumper member to thereby lock the brake wheel and reel against further extraction rotation.

The improved retractor is reliable, rugged and highly wear resistant.

BRIEF DESCRIPTION OF THE DRAWINGS

FIG. 1 is a vertical longitudinal sectional view of a safety belt retractor embodying the present invention;

FIG. 2 is a exploded perspective view of an essential portion of the retractor;

FIG. 3 is a side elevational view of the retractor shown partially broken away and in a normal reel freely rotatable condition;

FIG. 4 is a view similar to FIG. 3 but showing the reel in a braked condition.

DESCRIPTION OF THE PREFERRED EMBODIMENT

Referring now to the drawings which illustrates a preferred embodiment of the present invention, the reference numeral 1 generally designates a mounting frame which includes a base or cross member and plate or side members 1a, 1b, a shaft being journalled to and disposed between the side members 1a, 1b by means of bearings 4 or 5. To the outer surface of one side member 1b, is mounted a spring housing 6 containing a coil spring which is connected to shaft 3 to provide a retracting force to a seat belt by way of the retractor reel. On the shaft 3 is mounted a reel 2 around which the seat belt is wound, the reel 2 and shaft 3 being rotated together as a unit. Along the outer surface of the other side member 1a is disposed a ratchet wheel 13 which is secured to the end of shaft 3 opposite to the spring member 6.

As shown in the drawings, a stop member 14 is provided proximate to and in the plane of the ratchet wheel 13, and is provided with a tooth or claw 14a, which is engageable with and disengageable from the teeth of the ratchet wheel 13 with the stop member in advance of and at its retracted position respectively. The stop member is longitudinally slidingly moveable in the tangential direction with respect to the circumscribed circle or periphery of the ratchet wheel 13 and the lower end of the stop member 10 contacts one end of a lever 21 which is moved by sensing means to be described later. By the swinging movement of the lever 21, the stop member 14 is slidingly moved in the tangential direction with respect to the circumscribed circle of the ratchet wheel 13.

Reference numeral 8 designates an auxiliary frame or guide member made of a synthetic organic polymeric resin or plastic material and attached to the outer surface of the side member 1a. The auxiliary frame member 8 has circular opening or hole 9 in the central portion thereof in which the ratchet wheel 13 rotatably nests and an elongated stop member 14 slidably engages guide slot or groove 10 communicating with the circular hole 9. The guide groove 10 extends in a direction tangential to the circular hole 9.

Outwardly projecting reinforcing ridges or walls 10a and 10b extend integrally with and perpendicularly from both side borders of the guide groove 10 and from the stop edge abutting the claw 14a when the stop member 14 is lowered or retracted.

The auxiliary member 8 has a laterally and vertically extending side recess or space delineated at its top by the leading upper transverse edge of guide groove 10 and terminating at its bottom at the level of the top of flange 10a, the side recess communicating along its inner side with guide groove 10.

The side recess or space is occupied by a separate reinforcing block or plate 11 which characterizes the improved retractor in accordance with the invention. The reinforcing block 11 and auxilliary plate 8 are fastened so that the two members 8 and 11 form a rigid unitary assembly with each other and accommodate the ratchet wheel 13 and stop member 14.

The transverse leading or upper edge or end of the groove 10 forms an abutment for limiting the upward movement of the stop member 14. Thus, the stop member 14 abuts the reinforcing block 11 at its advanced or upper position. The lower end of the path of the claw 14a along the junction of the guide groove 10 and the hole 9 as defined by the respective inclined edge limits the downward or retraction movement of the claw 14a and stop member 10.

The reinforcing block 11 preferably of great strength in relation to that of the stop member 14, and is preferably made of a metal material, while the auxiliary member 8, which need not be so tough, can be molded of a synthetic polymeric resin as an integral body. However, provided that a sufficient strength is ensured, the reinforcing block 11 may be made of a reinforced synthetic polymeric resin plate.

The reinforcing block 11 which is illustrated as of inverted L-shape including an upper transverse leg for engaging the stop member 14, may have other shapes than that illustrated if it performs a similar function.

As seen in FIG. 2, reference numerals 16 and 17 designate rivet bores in the reinforcing block 11 and the auxiliary member 8, while numerals 18 and 19 designate rivet bores in the frame side plate 1a for receiving rivets 12 and 15 engaging the rivet bores 16 and 17.

In the unitary assembly consisting of the auxiliary member 8 and the reinforcing block 11, the receiving or stop surface of the reinforcing block 11 at the upper end of the groove 10 is of a breadth equal to that of the stop member 14, while the claw receiving or stop shoulder or portion at the lower end of the junction of opening 9 and groove 10 is of a breadth substantially equal to the projection length of the claw.

The front inner edge or portion of the stop member 14 between the upper front end thereof and the extreme end or tip of the claw 14a is of an arcuate shape corresponding to the outer circle or periphery of the ratchet wheel 13 and when the claw is positioned, for example, at its retracted or lowermost position in FIG. 3, it forms a part of the circle of the hole 9 in the auxiliary plate 8.

A displacement member 24, such as a weight or the like, is displaced by a positive or negative acceleration or a tilting of the vehicle such as in an emergency or when the vehicle collides with an object. The displacement member 24 is swingably suspended from the upper wall of a housing or receiver 23 therefor to form a pendulum. The displacement member 24, which constitutes an acceleration or displacement sensing means, is provided with means to transmit the displacement thereof to an end pivoted lever 21 bearing at the middle portion thereof in a recess provided in the central portion of the upper surface of fulcrum defining the enlarged head atop the arm suspending the displacement weight. The displacement member 24 thus controls the vertical movements of the stop member 14. The above acceleration sensing mechanism is of known construction.

Reference numeral 20 designates a cover, and 22 a rivet with which a lever 21 is mounted on receiver 23, which rivet 22 engages a hole in a projection or post on the upper surface of the receiver 23 and a hole in one end portion of the lever 21. Screws 25 secure the receiver 23 to the side member 1a, engaging holes 26 in the side member 1a. The side member 1a and 1b are mutually reinforced by a connector bar extending between the upper edges or side members 1a and 1b.

Considering now the operation of improved retractor described above, FIG. 3 shows the retractor in the case where the vehicle is stationary or running at a uniform speed in a normal condition. Under such condition, the displacement member 24 is stationary or almost stationary in a normal equilibrium position and the lever 21 provided above the upper surface of the receiver 23 and the stop member 14 are kept in their lowermost or retracted positions under the influence of their own weights or light springs (not shown). At this time, the claw 14a of the stop member 14 is not engaged with the ratchet wheel 13. Then, the ratchet wheel 13, shaft 3 and reel 4 are freely rotatable to allow the safety belt A to be freely retracted and withdrawn in accordance with the movement of the belt restrained occupant on the vehicle.

When the vehicle collides with an object so that at least a predetermined negative acceleration thereof occurs, one end portion of the displacement member 24 is displaced in the upward direction in the known manner to raise the outer end portion of the lever 21 as shown by broken line in FIG. 4. At this time, the stop member 14 is longitudinally slidingly advanced in the tangential direction with respect to the circumscribed circle of the ratchet wheel 13, along the confronting faces of the vertical walls 10a and 10b, and the claw 14a of the stop member 14 slightly engages the teeth of the ratchet wheel 13. In this case, the belt A is strongly pulled or extracted in the withdrawing direction due to the momentum of the belt engaged vehicle occupant, and the ratchet wheel 13 is urged to rotate counterclockwise as viewed in FIGS. 3 and 4. Thus, even when the displacement member 24 is returned to its original or normal equilibrium position with the end portion of the lever 21 lowered, the stop member 14 is further slidingly advanced in the ratchet wheel tangential direction. Consequently, the claw 14a progressively more deeply engages the teeth of the ratchet wheel 13 as shown in FIG. 4. The stop member 14 is thus raised by the ratchet wheel 13 until the sliding advance movement of the former is stopped by the downwardly facing transverse stop surface of the reinforcing block 11 at the upper end of the guide groove 10 in the auxiliary member 8. While the stop member 14 is slidingly advanced as explained above, the claw 14a is never kicked off or ejected from the tips of the teeth of the ratchet wheel 13. When the advance of the stop member 14 is halted by the block 11 the rotation of the shaft 3 and withdrawal of the belt A are simultaneously stopped.

When the belt A is then released and slackened, the ratchet wheel 13 is spring rotated clockwise to retract the belt and the stop member 14 is thus returned to its original retracted position as shown in FIG. 3.

The improved structure described above is not limited to the illustrated embodiment. The structure of the present invention is equally applicable to other types of retractors having an auxilary member which slidably guides a stop member and accordingly requires an abutment for limiting the sliding movement of the stop member.

For example, the improved structure can be applied to such a retractor which includes a pair of similarly functioning stop members as that of the present invention and slidably engaging respective corresponding guide grooves disposed at opposite sides of the ratchet wheel. The stop members are coupled by a connecting rod having elongated slots formed at both ends of the latter for receiving respective pins carried by the stop members. The stop members accordingly move in reverse vertical directions, in such a manner that one advances upwardly when the other advances downwardly, so that, when one of the stop members engages the teeth of the ratchet wheel, the other stop member simultaneously engages the ratchet wheel at the opposite side thereof. In this arrangement, the paths of the stop members and the stop member guide portions can conveniently have the vertical walls and the reinforcing blocks in the same manner as those in the illustrated embodiment, and such a construction is within the scope of the present invention.

As has been explained, the structure of the present invention can be applied to such mechanisms which employ a stop member that is longitudinally slidable in the tangential direction of the ratchet wheel, in place of the conventional mechanism employing a pawl bridging both side plates of the reel mounting frame and advanceable into engagement with the ratchet wheel through a rocking movement. According to the present invention, both side edges of the stop member guide path as well as the edge functioning as a stop for the claw, are provided with upstanding shoulder defining walls so as to ensure a smooth longitudinal or up and down sliding movement of the stop member and so as to further reinforce these edges and the portion.

In addition, a further advantage resides in that the advance of the stop member is sharply terminated by a receiving or stop surface having a certain breadth and made of a block or plate of increased strength, and a reliable member advance terminating function can be ensured for a longer time, even with the repeated application of the shock or impact force to the stop member due to the repeated engagement and disengagement of the stop member with and from the bumper or stop face as the stop member reciprocates.

Further, the major part of the auxiliary guide member is made of a thin plastic plate, so as to reduce the cost and to contribute to the economy and efficiency of production.

While there has been described and illustrated a preferred embodiment of the present invention, it is apparent that numerous alterations, omissions and additions may be made without departing from the spirit thereof.

I claim:

1. An automatic locking safety belt retractor comprising a mounting frame including opposite side walls, a belt retractor reel extending between said side walls and rotatable in belt extraction and belt retraction directions and spring biased to rotate in a belt retraction direction, a peripherally toothed brake wheel located along the outside face of a first of said side walls and rotatable with said reel, a guide member mounted on said first side wall outside face and having a circular opening concentric with and engaged by said brake wheel and a guide slot extending from a trailing to a leading edge thereof parallel to a tangent to said circular opening and communicating along a side of said slot with said circular opening through an access opening, a shock resistant bumper member located in said slot at the leading end thereof, a stop member engaging said slot and being longitudinally slidably movable therein between retracted and advanced positions and including an inwardly directed tooth registering with said access opening and being out of engagement with said brake wheel in the stop member retracted position and engaging said brake wheel in a position of said stop member in advance of its retracted position, and sensing means for advancing said stop member to bring said tooth into engagement with said brake wheel whereby belt extraction rotation of said brake wheel further moves said stop member to its fully advanced position to strike and be stopped by said bumper member to thereby lock said brake wheel and reel against further extraction rotation.

2. The retractor of claim 1 wherein said slot side access opening has an inclined bottom edge parallel to and engaging the confronting edge of said tooth in the stop member retracted position.

3. The retractor of claim 2 including outwardly directed shoulders formed along the opposite edges of said slot and along said access opening bottom edge.

4. The retractor of claim 3 including a laterally extending side recess formed at the leading part of said guide slot, said bumper engaging said side recess and including a portion intercepting the longitudinal axis of said guide slot.

5. The retractor of claim 3 wherein said bumper member is L-shaped with one leg thereof engaging said recess and the other leg thereof defining said axis intercepting portion and said bumper member being secured to said first side wall.

6. The retractor of claim 1 wherein said guide member comprises a plate formed of a synthetic organic polymeric resin and said bumper is formed of metal.

7. The retractor of claim 1 wherein said guide member comprises a plate formed of a synthetic ceramic polymeric resin and said bumper member is formed of a filler reinforced synthetic organic polymeric resin composition and is of greater thickness than said plate.

8. An acceleration responsive retractor including a belt retractor reel and comprising an auxiliary frame member formed of a synthetic resin composition and which has a circular hole for engaging a reel affixed ratchet wheel therein a stop member having a tooth thereon for engaging said ratchet wheel to prevent rotation of said reel, said auxiliary frame member having therein a guide groove tangent to and communicating with said hole said groove including first edge portions for longitudinally slidably engaging said stop member therein between a retracted position in which said stop member tooth is out of engagement with said ratchet wheel and an advanced position in which the stop member tooth engages said ratchet wheel, said auxiliary frame member being attached to a reel support frame side member, and a second edge portion extending from one of said first edge portions for engaging the tooth of said stop member in its retracted position, said edge portions being provided with outwardly projecting walls which are formed integrally with said edge portions, a portion of said frame auxiliary member that is above said walls being provided with a side recess extending transversely from said groove and a reinforcing member of relatively high physical strength mounted in said side recess and extending into the groove and into the path of said stop member and functioning as a bumper for said stop member in its advanced position.

9. An acceleration responsive retractor according to claim 8, wherein said reinforcing member is made of a metal.

10. An acceleration responsive retractor according to claim 8, wherein said reinforcing member is made of a reinforced synthetic resin.

* * * * *